United States Patent [19]
Sellati

[11] Patent Number: 5,957,416
[45] Date of Patent: Sep. 28, 1999

[54] WIRE AND CABLE SUPPORT SYSTEM

[76] Inventor: Christopher G. Sellati, 9400 NW. 25th St., Miami, Fla. 33172

[21] Appl. No.: 08/989,867

[22] Filed: Dec. 12, 1997

[51] Int. Cl.⁶ ..................................................... E21F 17/02
[52] U.S. Cl. .............................. 248/61; 248/58; 248/68.1
[58] Field of Search .................................. 174/69, 40 CC, 174/43, 72 A, 135, 2, 3; 248/58, 60, 61, 63, 68.1, 2.4, 229.26, 230.9, 231.81, 34, 305, 307, 339, 340, 341, 903, 119.2, 387

[56] References Cited

U.S. PATENT DOCUMENTS

| | | | |
|---|---|---|---|
| 313,305 | 3/1885 | Eckert et al. | 248/61 |
| 355,491 | 1/1887 | Wiley | 248/61 |
| 810,004 | 1/1906 | Tabler | 248/61 |
| 886,241 | 4/1908 | Norton | 248/339 |
| 2,417,244 | 3/1947 | Eggert et al. | 248/61 |
| 3,022,030 | 2/1962 | Geer | 248/58 |
| 3,033,978 | 5/1962 | Van Dusen, Jr. | 240/3 |
| 3,233,856 | 2/1966 | Ammerman | 248/229.26 |
| 3,289,983 | 12/1966 | Mennerdahl | 248/60 |
| 3,606,157 | 9/1971 | Chapin | 239/118 |
| 4,014,504 | 3/1977 | Sachs | 248/61 |
| 4,526,428 | 7/1985 | Sachs | 339/14 R |
| 4,562,982 | 1/1986 | McSherry et al. | 248/61 |
| 5,141,192 | 8/1992 | Adams | 248/231.8 |
| 5,314,155 | 5/1994 | Behrendt et al. | 248/301 |
| 5,542,631 | 8/1996 | Bruno | 248/58 |
| 5,740,994 | 4/1998 | Laughlin | 248/68.1 |

*Primary Examiner*—Ramon O. Ramirez
*Assistant Examiner*—Gwendolyn Baxter
*Attorney, Agent, or Firm*—Oltman, Flynn & Kubler

[57] ABSTRACT

A support system for conductor wires within a building having horizontally spaced apart building structural points includes a support line having two support line ends, an anchoring mechanism anchoring the support line ends to the spaced apart building structural points, and at least one hanger suspended from the support line, the at least one hanger having an engaging structure for engaging and supporting the conductor wire at a given location along the conductor wire.

15 Claims, 2 Drawing Sheets

WIRE AND CABLE SUPPORT SYSTEM

BACKGROUND OF THE INVENTION

1. Field of the Invention

The present invention relates generally to the field of structures for supporting conductor wires, such as those connecting computer networks and voice systems, extending through the space above drop ceilings in warehouses and in virtually any other horizontal region within a building. More specifically the present invention relates to a conductor wire support system including a wire rope anchored at its ends to opposing structural points within a building and to a series of spaced apart hangers suspended from the wire rope, each hanger having engaging means for connecting to and supporting a conductor wire, or other system element.

Each hanger has a wire rope engaging end which slidingly wraps over the wire rope so that the hanger is radically pivotable entirely around the wire rope. This freedom to pivot assures that the hanger is always substantially perpendicular to the wire rope it engages, for balanced loading and even stress distribution. A wire rope gripping element is fitted within a notch in the engaging end of the hanger and is affixed to the wire rope, such as by crimping, to secure the hanger against substantial longitudinal movement along the wire rope while permitting the full pivoting movement about the wire rope.

2. Description of the Prior Art

There has been a continuing need for a support system for conductor wires which connect computer, voice and other communication systems within buildings. A problem has been that regulations such as fire codes do not permit the use of existing building structures to support such wires. Specialized independent hanger structures have generally served this need so far, but have notable disadvantages. One disadvantage has been that these devices require a building structure directly above for securing the device. The result has been that there are sometimes inappropriate gaps in the series of wire supporting devices in the regions where there is no suitable building structure immediately overhead.

There have long been various types of wire and cable support devices designed for other uses. Yet these devices are not well suited to meet typical conductor wire support needs. In some instances their use would be prohibited by applicable codes or regulations, such as a requirement that no weight and no clamping pressure be placed on conductor wires.

One such prior device is that of Bruno, U.S. Pat. No. 5,542,631, issued on Aug. 6, 1996. Bruno discloses an adjustable pipe hanger for suspending a pipe from a support structure at a desired angle relative to the support structure. The support structure may be a plank. The pipe hanger includes an elongate stem for mounting to the support structure, a rib integral with and extending along part of one side of the stem, and a hook that slides over the stem and rib and which may be rotated about one end of the stem and locked at any of several angles with respect to the support structure. A problem in using the Bruno pipe hanger for conductor wire support is that there must be a suitable building structure directly overhead each desired wire support point for fastening the pipe hanger. Another problem is that the pipe hanger appears to be narrow at its engaging end, so that loading on the conductor wire would be concentrated, increasing the likelihood of conductor wire deformation and damage.

Behrendt, et al., U.S. Pat. No. 5,314,155, issued on May 24, 1994, reveals a device for suspending a cable sleeve on a support cable. Behrendt, et al., includes a strip-shaped securing part which has one end fashioned as a hook and the other end fashioned as a mounting lug for securing to ends of the cable sleeve. The securing part is preferably provided with an arrangement to prevent accidental disengagement of the hook from the support cable. A problem with Behrendt, et al., is that it is directed to use where a cable sleeve is employed. It does not spread loading along the cable or conductor wire apart from use of the sleeve, and would likely damage a conductor wire if used for support without the sleeve. Each sleeve, on the other hand, requires two securing parts, so that costs are doubled.

McSherry, et al., U.S. Pat. No. 4,562,982, issued on Jan. 7, 1986, teaches a stackable cable spacer for preventing abrasion damage between support and signal transmission cables. McSherry, et al., interconnects a support cable with a signal transmission cable with a strap wrapped around both cables. A selected number of spacer elements separate the two cables, and the strap extends through passageways in the stacked spacer elements. The problems of Bruno are again presented.

Sachs, U.S. Pat. No. 4,526,428, issued on Jul. 2, 1985, for a multi-strand cable clamp with positive strand engagement, and Sachs, U.S. Pat. No. 4,014,504, issued on Mar. 29, 1977, for a cable hooking device, both disclose guy wire clamps with messenger wire holder engaging elements. The clamp includes opposing plates with angled intermeshing teeth to grip the guy wire, and a nut and bolt passing through the opposing plates to draw the plates together. If either Sachs device were used for supporting a conductor cable within a building, with the holder engaging elements retaining the conductor wire, the problems Behrendt, et al. would again be presented.

Van Dusen, Jr., U.S. Pat. No. 3,033,978, issued on May 8, 1962, teaches a catenary lighting apparatus. Van Dusen, Jr. includes light support units having spacers which are connected respectively to the upper and lower cables to tie them together at each lighting location. The spacers each include an offset portion adjacent the cable which is adapted to carry a service car to permit ready passage of the service car. The light unit is secured in place by a supporting member which is pivotally connected to the spacing means in spaced relation to the light supporting cable. The pivotally connected supporting member is normally arranged to maintain the center of gravity of the light support unit in the vertical plane of the cable and thus in the path of the service car. The pivotal suspension member may, however, be deflected or swung out of the way by the service man to provide ready passage of the cable car. A problem with Van Dusen, Jr. is that it does not broadly spread loading on the supported wire. Another problem is that it is complex and costly, having been designed for a very different purpose.

Mennerdahl, U.S. Pat. No. 3,289,983, issued on Dec. 6, 1966, reveals a device for carrying an electric cable. Mennerdahl includes a split ring portion for receiving the support cable and a leather strap extending downwardly from the ring portion and wrapping around the electric cable. The need to fit the support cable through the ring gap and then wrap the strap over the gap makes Mennerdahl relatively labor intensive to install.

Adams, U.S. Pat. No. 5,141,192, issued on Aug. 25, 1992, discloses an apparatus for hanging cords from a rain gutter or similar structure. Adams is essentially an extruded molded plastic or aluminum strip having loop contours to engage the rain gutter at one end and a wire such as for holiday light strings at the other end. Adams is not well suited to engage structures above drop ceilings to support a conductor wire, and otherwise presents the problems identified above for Bruno.

It is thus an object of the present invention to provide a support system within buildings for conductor wires connecting computers and other communication systems, which does not require an overhead building engaging structure for each conductor wire support.

It is another object of the present invention to provide such a support system which reduces the extensive labor associated with installing the numerous independently connected elements making up conventional support systems.

It is still another object of the present invention to provide such a support system which longitudinally spreads the surface area over which the support system elements engage the conductor wires to spread the loading on the conductor wire and thereby prevent sharp bends in the conductor wires, and maintain their transmission capabilities, meeting new high bandwidth requirements specified by the EIA/TIA Category 5 transmission standard.

It is finally an object of the present invention to provide such a support system which eliminates the need for workers to crawl through conductor wire routes to place individual support devices, with related drilling dust and clean-up, and which also eliminates the unsuitable practice of simply laying the conductor wires on top of ceiling structures.

SUMMARY OF THE INVENTION

The present invention accomplishes the above-stated objectives, as well as others, as may be determined by a fair reading and interpretation of the entire specification.

A support system is provided for conductor wires within a building having horizontally spaced apart building structural points, including a support line having two support line ends, an anchoring mechanism anchoring the support line ends to the spaced apart building structural points, and at least one hanger suspended from the support line, the at least one hanger having an engaging structure for engaging and supporting the conductor wire at a given location along the conductor wire.

The system preferably includes a series of these hangers spaced apart from each other along the conductor wire and the support line. The hangers are preferably spaced apart from each other uniformly. Each hanger preferably includes a support line engaging end slidingly wrapping over the support line so that the hanger is pivotable entirely around the support line.

The support line engaging end of each hanger preferably includes a hanger notch exposing a notch segment of the support line, additionally including a support line gripping mechanism fitted within the hanger notch and affixed to the support line notch segment for securing the hanger against substantial movement longitudinally along the support line while permitting radial pivoting movement of the hanger about the support line.

The hanger plate preferably has an engaging structure including a support line engaging end and an elongate strip segment extending from and below the engaging end. The support line engaging end preferably includes a hook portion which is bent over and downwardly to form an inverted channel fitting over the support line and thereby suspending the hanger from the support line. The hanger plate line engaging end is preferably wide relative to the elongate strip segment, for spreading loading over a greater length of the support line to prevent bending and creasing of the support line, and to prevent pivoting of the hanger in a direction parallel to the support line. The hanger notch preferably is cut in the middle of the line engaging end and extends below the level of the support line, and the elongate strip is preferably bent to substantially form a loop for fitting around the conductor wire to engage and support the conductor wire.

The hanger plate preferably includes plate edges which are rolled to provide enhanced structural strength and a smoother surface for the conductor wire to slide over during system installation. The hanger plate preferably includes a longitudinal corrugation for increasing the structural strength of the hanger plate. The gripping mechanism preferably includes a crimping element crimped onto the support line notch segment. The crimping element preferably includes a ductile metal disk having a circumferential edge and a center port, and a radial slot interconnecting the circumferential edge and the center port, so that the disk is fitted into the plate notch with the radial slot receiving the support line notch segment. The system optionally additionally includes support line intermediate support structures between the support line ends, connecting the support line to structural portions of the building. The support line is preferably a wire rope.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
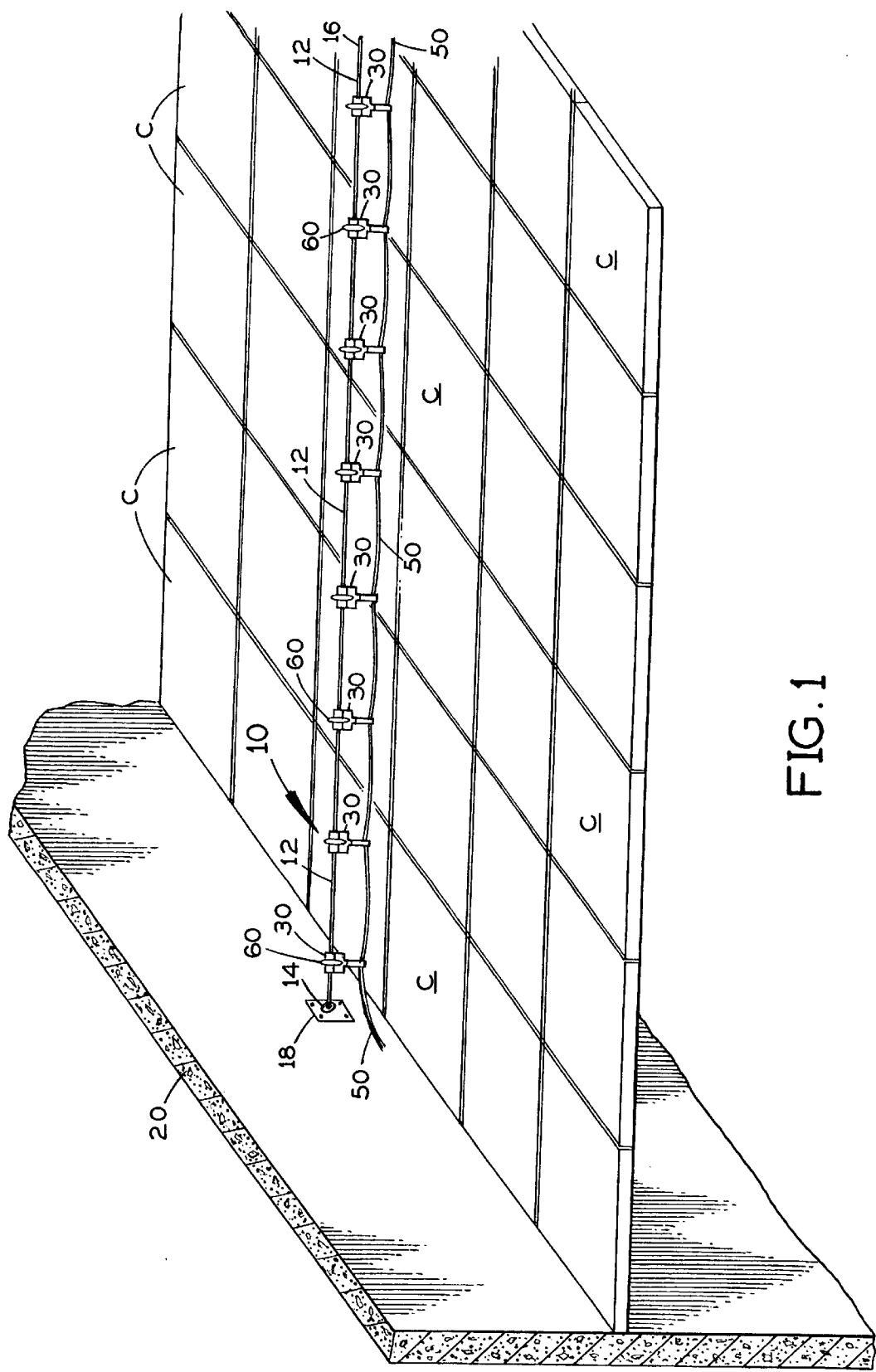
FIG. 1 is a perspective view of the upper face of a drop ceiling, and a conductor wire extending over the upper face supported by the inventive support system.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
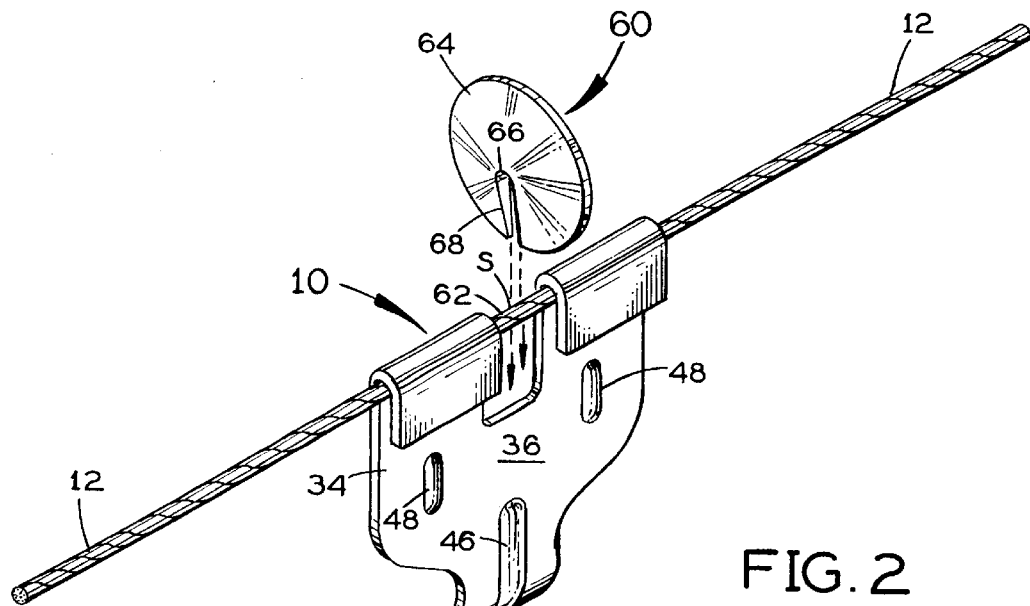
FIG. 2 is a prespective view of one of the hangers shown suspended from a wire rope and a crimping disk positioned to be fitted into the the and onto the rope wire notch segment.
Figure 3:
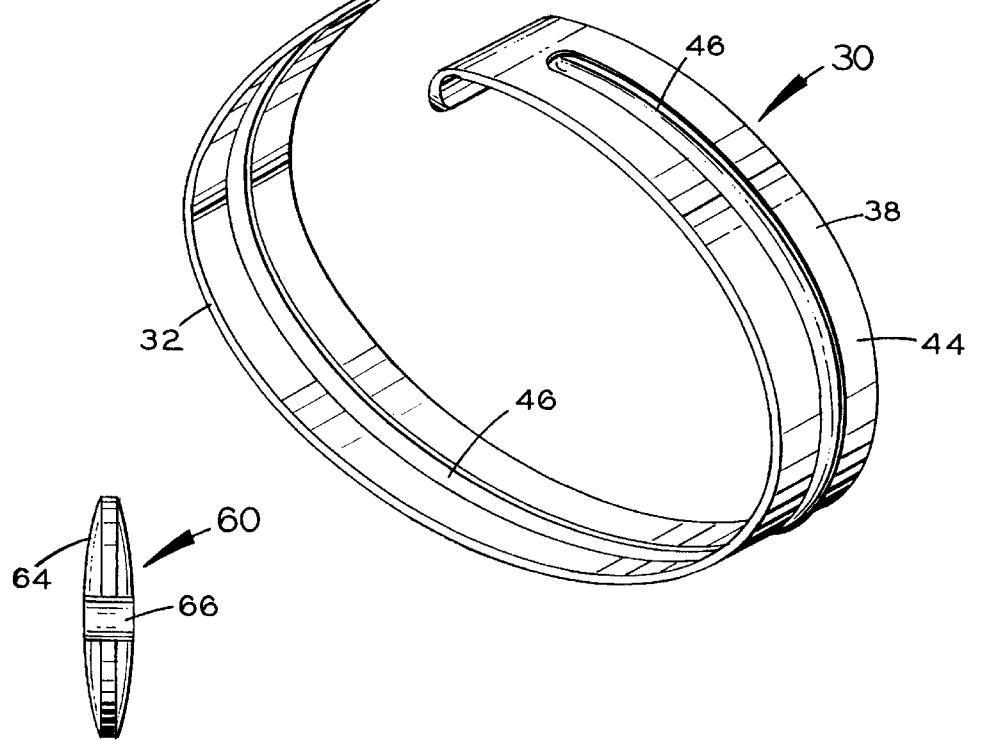
FIG. 3 is a cross-sectional edge view of the preferred crimping disk, showing the central disk port.

Referring to FIGS. 1–3 a conductor wire support system 10 is disclosed. Support system 10 includes a support line such as a stranded wire rope 12 anchored with conventional anchoring means 18 at its wire rope ends 14 and 16 to opposing structural points, such as upper ends of building walls 20 above a drop ceiling C, within a building. A series of spaced apart hangers 30 are suspended from wire rope 12, and each hanger 30 has engaging means 32 for connecting to and supporting a conductor wire 50, or other system element. See FIG. 1.

Each hanger 30 has a wire engaging end 34 which slidingly wraps over the wire rope 12 so that the hanger 30 is pivotable entirely around the wire rope 12. This freedom to pivot assures that the hanger 30 is always substantially perpendicular to the wire rope 12 it engages, for balanced loading and even stress distribution. A wire rope crimping element 60 is fitted within a hanger notch 62 in engaging end 34 and is affixed to wire rope 12, such as by crimping, to secure the hanger 30 against substantial longitudinal movement along wire rope 12 while permitting 360 degree pivoting movement about the wire rope 12. The spacing between hangers 30 is preferably, although not necessarily, uniform.

Each hanger 30 is preferably a stamped metal plate 36 having a wider engaging end 34 tapering downwardly to a somewhat narrower elongate strip portion 44. See FIG. 2. Engaging end 34 has a hook portion 38 which is bent over and downwardly to form an inverted channel for fitting over wire rope 12 and thereby suspending the hangers 30 from wire rope 12. The greater width of the hooked engaging end 34 spreads the loading over a greater length of wire rope 12 and thus prevents bending and creasing of wire rope 12. By the same token, the width of elongate strip portion 44, although less than that of engaging end 34, spreads conductor wire 50 loading for the same result. The greater width also prevents pivoting of the hanger 30 in a direction parallel to the wire rope 12, so that the conductor wire 50 can be pulled through the hanger engaging means 32 without the hangers 30 swinging toward wire rope 12 and out of alignment with each other.

The hanger notch 62 is cut in the middle of the engaging end 34 and preferably extends below the level of wire rope 12, exposing a wire rope 12 notch segment S. Elongate strip portion 44 is formed of a ductile material to hold its shape after being bent, and is bent around itself to form a rough loop. The loop fits around conductor wire 12 to engage and support the wire 12.

The edges of plate 36 are preferably bent or rolled to provide structural strength as well as a smooth surface for conductor wire 50 insulation material to pass over when the conductor wire 50 is being pulled through engaging end 34. A central longitudinal corrugation 46 or rib is preferably provided in plate 36, stopping short of each plate 36 end, to increase the strength of plate 36. Two short corrugations 48 are also preferably provided in engaging end 34 on either side of the longitudinal corrugation 46.

Crimping element 60 is preferably a ductile metal disk 64 having a center port 66 and a radial slot 68 interconnecting the disk circumferential edge and center port 66. See FIGS. 2 and 3. Disk 64 is fitted into hanger notch 62 so that the radial slot 68, and ultimately the center port 66, receives wire rope 12. Each hanger 30 is slid along wire rope 12 to a desired position over the conductor wire 50 to be supported, and then disk 64 is crimped with a crimping tool (not shown) to close the slot 68 and port 66 edges tightly against wire rope 12 and thereby fictionally affix disk 64 to wire rope 12. The width of notch 62 then limits the longitudinal movement of hanger 30 along wire rope 12.

Intermediate supports (not shown) of conventional design between wire rope 12 and the building structure are preferred for long wire rope 12 spans, and such intermediate supports are preferably spaced every twenty to thirty feet along wire rope 12. The spacing standards for the communication industry are forty eight to sixty inches.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A support system for conductor wires within a building having horizontally spaced apart building structural points, comprising:

a support line having two support line ends structured for attachment to the building structural points, and at least one hanger suspended from said support line, said at least one hanger having engaging means for engaging and supporting conductor wires, and a support line engaging end slidingly wrapping over said support line such that said hanger is pivotable entirely around said support line, said support line engaging end comprising a hanger notch exposing a notch segment of said support line and support line gripping means fitted within said notch segment for securing said hanger against substantial movement longitudinally along said support line while permitting radial pivoting movement of said hanger about said support line.

2. A support system according to claim 1, comprising a series of said hangers spaced apart from each other along said support line.

3. A support system according to claim 2, wherein said hangers are spaced apart from each other uniformly.

4. A support system according to claim 1, wherein said hanger comprises:

a hanger plate having an elongate strip segment extending from and below said support line engaging end.

5. A support system according to claim 4, wherein said support line engaging end is wide relative to said elongate strip segment, for spreading loading over a greater length of said support line to prevent bending and creasing of said support line, and to prevent pivoting of said hanger in a direction parallel to said support line.

6. A support system according to claim 4, wherein said hanger notch is cut in the middle of said support line engaging end and extends below the level of said support line, and wherein said elongate strip is bent to substantially form a loop for fitting around, engaging and supporting conductor wires.

7. A support system according to claim 4, wherein said hanger plate comprises plate edges and wherein said plate edges are rolled to provide enhanced structural strength and a smoother surface for conductor wires to slide over during system installation.

8. A support system according to claim 4, wherein said hanger plate comprises a longitudinal corrugation for structurally strengthening said hanger plate.

9. A support system according to claim 1, wherein said support line engaging end includes a hook portion which is bent over and downwardly to form an inverted channel fitting over said support line and thereby suspending said hanger from said support line.

10. A support system according to claim 1, wherein said gripping means comprises a crimping element crimped onto said support line notch segment.

11. A support system according to claim 10, wherein said crimping element comprises a ductile metal disk having a circumferential edge and a center port, and a radial slot interconnecting said circumferential edge and said center port, such that said disk is fitted into said plate notch with said radial slot receiving said notch segment.

12. A support system according to claim 1, additionally comprising intermediate support means between said support line ends, for connecting said support line to structural portions of said building.

13. A support system according to claim 1, wherein said support line is a wire rope.

14. A support system within a building having horizontally spaced apart building structural points, comprising:

a conductor wire, a support line having two support line ends structured for attachment to the building structural points, and at least one hanger suspended from said support line, said at least one hanger having engaging means for engaging and supporting conductor wires, and a support line engaging end slidingly wrapping over said support line such that said hanger is pivotable entirely around said support line, said support line engaging end comprising a hanger notch exposing a notch segment of said support line and support line gripping means fitted within said notch segment for securing said hanger against substantial movement longitudinally along said support line while permitting radial pivoting movement of said hanger about said support line.

15. A support system for system elements within a building having horizontally spaced apart building structural points, comprising:

a support line having two support line ends, anchoring means anchoring said support line ends to said spaced apart building structural points, at least one hanger suspended from said support line, said at least one hanger having engaging means for engaging and supporting said system element at a given location, and a support line engaging end slidingly wrapping over said support line such that said hanger is pivotable entirely around said support line, said support line engaging end comprising a hanger notch exposing a notch segment of said support line and support line gripping means fitted within said notch segment for securing said hanger against substantial movement longitudinally along said support line while permitting radial pivoting movement of said hanger about said support line.

\* \* \* \* \*